(12) United States Patent
Varkey et al.

(10) Patent No.: US 7,603,011 B2
(45) Date of Patent: Oct. 13, 2009

(54) HIGH STRENGTH-TO-WEIGHT-RATIO SLICKLINE AND MULTILINE CABLES

(75) Inventors: Joseph Varkey, Missouri City, TX (US); Anil Singh, Edmonton (CA); Byong Jun Kim, Sugar Land, TX (US); Vladimir Hernandez, Stafford, TX (US); Shannon Nimchan, Richmond, TX (US); Dan Tabalan, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 11/561,549

(22) Filed: Nov. 20, 2006

(65) Prior Publication Data

US 2008/0118209 A1   May 22, 2008

(51) Int. Cl.
*G02B 6/44* (2006.01)
(52) U.S. Cl. .................. 385/101; 285/102; 285/109; 285/113
(58) Field of Classification Search ......... 385/100–103, 385/109, 113
See application file for complete search history.

(56) References Cited

U.S. PATENT DOCUMENTS

| 5,619,606 | A | * | 4/1997 | Bonicel ..................... 385/102 |
| 6,580,449 | B1 | | 6/2003 | Meltzer |
| 6,907,934 | B2 | | 6/2005 | Kauffman |
| 7,152,685 | B2 | | 12/2006 | Adnan |
| 7,187,620 | B2 | | 3/2007 | Nutt |
| 2003/0059181 | A1 | * | 3/2003 | Jackman et al. ............. 385/102 |
| 2003/0168223 | A1 | | 9/2003 | Bergren |
| 2003/0179651 | A1 | | 9/2003 | Nutt |
| 2004/0221994 | A1 | | 11/2004 | Kauffman |
| 2005/0126777 | A1 | | 6/2005 | Rolovic |
| 2005/0236161 | A1 | | 10/2005 | Gay |
| 2005/0279511 | A1 | | 12/2005 | Adnan |
| 2006/0155471 | A1 | | 7/2006 | Tabarovsky |
| 2006/0157239 | A1 | | 7/2006 | Ramos |
| 2006/0173624 | A1 | | 8/2006 | Frenkel |
| 2006/0260739 | A1 | | 11/2006 | Varkey |
| 2006/0280412 | A1 | | 12/2006 | Varkey |
| 2007/0062696 | A1 | | 3/2007 | Wilson |

FOREIGN PATENT DOCUMENTS

EP       1301687       4/2003

* cited by examiner

*Primary Examiner*—Frank G Font
*Assistant Examiner*—Michael P Mooney
(74) *Attorney, Agent, or Firm*—Michael Flynn; David Cate; Jaime Castano

(57) ABSTRACT

Slickline cables and methods for preparing such cables are disclosed. A slickline cable includes a pre-manufactured polymer composite rod having a channel therein; an optical fiber disposed in the channel; a fastener securing the optical fiber in the channel, wherein the fastener is selected from the group comprising a polymer tape, a polymer layer, and a combination thereof, and an outer tube disposed outside the polymer composite rod having the optical fiber therein. A method for manufacturing a slickline cable includes preparing a polymer composite rod having at least one channel therein; placing at least one optical fiber in the at least one channel in the polymer composite rod; securing the at least one optical fiber in the at least one channel using a polymer tape, a polymer layer, or a combination of a polymer tape and a polymer layer; disposing an outer tube over the polymer composite rod.

19 Claims, 7 Drawing Sheets

HIGH STRENGTH-TO-WEIGHT-RATIO SLICKLINE AND MULTILINE CABLES

BACKGROUND OF INVENTION

1. Field of the Invention

The invention relates generally slickline cables used in oilfield operations.

2. Background Art

Fiber optic components in wireline or permanent monitoring cables have a great potential for data transfer applications. Unfortunately, this potential is offset by several weaknesses that make them vulnerable to damage in oilfield operations. For example, exposure to hydrogen at high temperatures results in darkening of the optical fiber which leads to a reduction in data carrying capacity. Evaporation of volatile organic compounds (VOCs) in coatings or other polymeric protective layers on the optical fibers releases hydrogen, which can attack and darken the fiber. Hydrolytic attack against glass in the presence of water is yet another source of damage.

Furthermore, linear stretch of the fiber is limited when compared to the other cable components. This requires additional fiber length in the optical fiber components, which complicates the manufacturing process. A lack of transverse toughness of the fiber component construction can result in potential point loading and micro-bending issues. These can lead to mechanical failure of the fiber and/or signal attenuation.

FIG. 1A shows a typical slickline cable. As shown, a slickline cable 100 consists of an optical fiber 110 contained in an inner steel tube 120, which is coated with a polymer (which may be a continuous or long fiber-reinforced) composite 130. An insulation layer 140, which may comprise thermoset resin such as epoxy, or other thermoplastic, is then added over the polymer composite 130 to complete the slickline core. Finally, an outer steel tube 150 is drawn over the slickline core to complete the slickline cable 100.

Several problems have been encountered with this design. The polymer composite 130 in the slickline core may become oval during manufacture. The inner steel tube 120 can move off center within the polymer composite 130. When the polymer composite 130 between the inner steel tube 120 and outer steel tube 150 has insufficient thickness (e.g., due to shrinkage or other factors), the polymer composite 130 and the outer steel tube 150 can separate from each other when the cable is flexed or spooled over sheaves.

In addition, different materials used in the slickline cable may have different coefficients of thermal expansion, which may cause some problems. For example, during manufacture, the polymer composite 130 and the inner steel tube 120 tend to swell. As the polymer composite 130 cures and cools, it tends to contract and pull away from the inner steel tube 120. Additionally, the inner steel tube 120 shrinks more in the longitudinal direction than does the polymer composite 130. During pultrusion and curing of the composite, the optical fiber is subjected to curing temperatures between 400 to 500° F. for a short period of time, which can damage the fiber's polymer coating. Also, the fiber finish of the composite may interfere with the epoxy curing.

One approach to an improved slickline cable is to coat the optic fiber with a resin jacket to form a more rugged fiber optic. FIG. 1B shows one such fiber optic having a continuous or long-fiber-reinforced epoxy thermoset resin jacket 115 over a commercially obtained optical fiber 110.

Although a fiber optic as shown in FIG. 1B is more robust, the processes of covering the fiber optics with the composite resin jackets may lead to some problems. For example, high loss of optical fiber can occur due to point loading in the pultrusion process. Shrinkage that occurs as the epoxy cures can impinge on the optical fiber and create signal attenuation problems. The need to handle the optical fibers carefully in order to reduce the likelihood of point loading and overpull in the pultrusion process makes manufacturing difficult and time-consuming. The high incidence of signal attenuation encountered with these fiber optic components is unacceptable for use in oilfield distributed temperature system measurements and in applications requiring long-length telemetry.

SUMMARY OF INVENTION

One aspect of the present invention relates to slickline cables. A slickline cable in accordance with one embodiment of the invention includes a pre-manufactured polymer composite rod having a channel therein; an optical fiber disposed in the channel; a fastener securing the optical fiber in the channel, wherein the fastener is selected from the group comprising a polymer tape, a polymer layer, and a combination thereof, and an outer tube disposed outside the polymer composite rod having the optical fiber therein.

Another aspect of the invention relates to methods for manufacturing slickline cables. A method in accordance with one embodiment of the invention includes preparing a polymer composite rod having at least one channel therein; placing at least one optical fiber in the at least one channel in the polymer composite rod; securing the at least one optical fiber in the at least one channel using a polymer tape, a polymer layer, or a combination of a polymer tape and a polymer layer; disposing an outer tube over the polymer composite rod.

Other aspects and advantages of the invention will be apparent from the following description and the appended claims.

DETAILED DESCRIPTION

The foregoing disclosure and description of the invention is illustrative and explanatory thereof and it can be readily appreciated by those skilled in the art that various changes in the size, shape and materials, as well as in the details of the illustrated construction or combinations of the elements described herein can be made without departing from the spirit of the invention. In addition, the cables can also comprise some components other than the ones already cited. In the summary of the invention and this detailed description, each numerical value should be read once as modified by the term "about" (unless already expressly so modified), and then read again as not so modified unless otherwise indicated in context.

Embodiments of the present invention relate to slickline cables, particularly slickline cables that have high strength-to-weight ratios, and processes for making such cables. To avoid exposure of optical fibers to high temperatures during the manufacturing processes, optical fibers may be placed in structures assembled from pre-manufactured composite components. Such composite components may be reinforced with fibers, particularly continuous or long fibers. In one aspect, embodiments of the invention relate to methods for manufacturing slickline cables, in which the optical fibers are enclosed in a composite resin jacket that is assembled from pre-manufactured pieces. In another aspect, embodiments of the present invention relate to slickline cables having polymer composite coated fiber optic components, which may further include electrical conductor components.

Figure 1A:
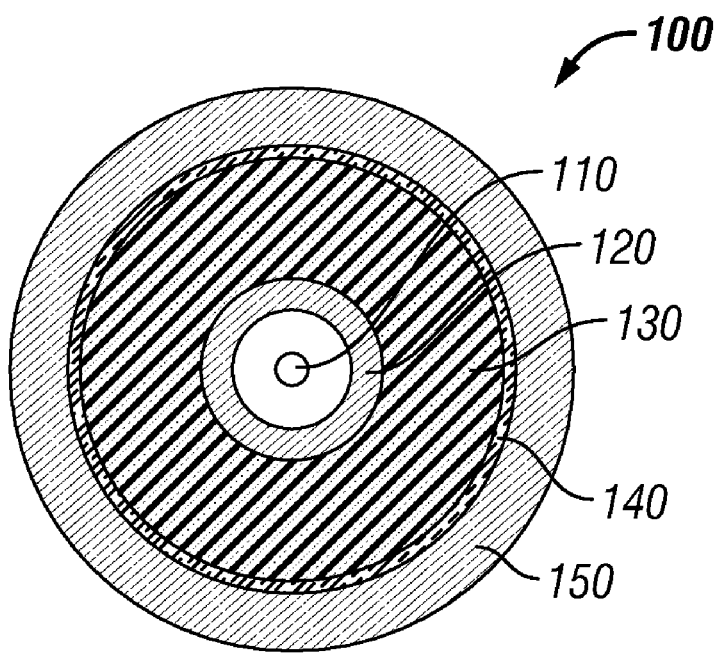
FIG. 1A shows a prior art slickline cable.
Figure 1B:
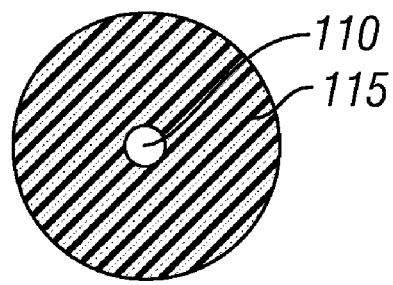
FIG. 1B shows a prior art design of an optical fiber core having a polymer composite layer embracing the optical fiber.

As noted above, the prior art processes for producing the conventional slickline cable or the "rugged" fiber optics shown in FIG. 1B are not ideal because they subject the optical fibers to high temperatures. Embodiments of the invention avoid some of these problems by pre-manufacturing components that will be assembled to form a composite resin jacket that include or form a channel for accommodating an optical fiber.

Figure 2:
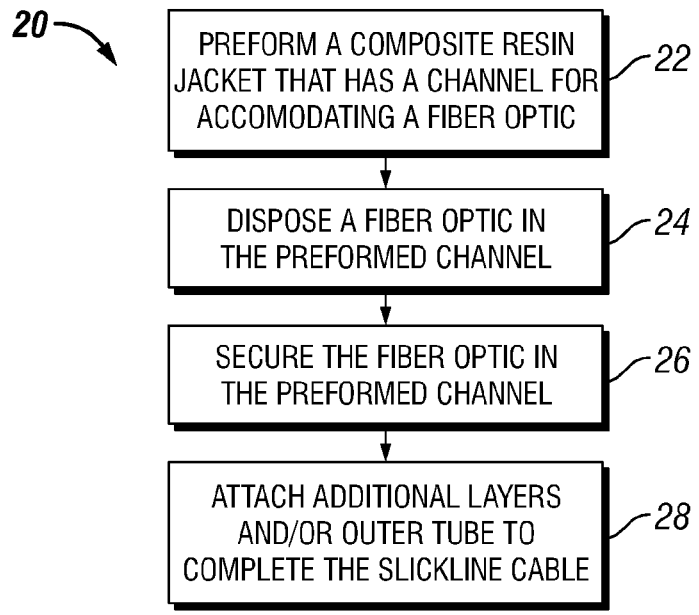
FIG. 2 shows a flow chart of a method in accordance with one embodiment of the invention for manufacturing a slickline cable.

FIG. 2 shows a schematic summarizing a method in accordance with one embodiment of the invention. As shown in FIG. 2, method 20 first forms a composite resin jacket that includes a channel for accommodating an optical fiber (step 22). The composite resin jacket having a channel may be formed in several ways, as will be described in more detail below. Note that the composite resin jacket may have a single channel or more than one channel to accommodate one or more fiber optics and/or other wires (e.g., a conductor). The resin jacket is preferably made of a fiber-reinforced polymer composite, more preferably a continuous or long fiber-reinforced polymer composite.

Once a composite resin jacket having a channel for accommodating a fiber optic is formed, a fiber optic may be placed into the channel (step 24). If the resin jacket is formed in pieces, this step of placing the optical fiber into the channel may be performed at the same time or after the assembly of the pieces to form the channels.

Next, the optical fiber is secured in the resin jacket (step 26). Various materials and methods may be used to secure the fiber optic in the resin jacket, including using a tape, a polymer layer, or a combination thereof. The polymer layer may comprise any suitable materials, including, but not limited to such thermoplastic materials as polytetrafluoroethylene-perfluoromethylvinylether polymer (MFA), perfluoro-alkoxyalkane polymer (PFA), polytetrafluoroethylene polymer (PTFE), ethylene-tetrafluoroethylene polymer (ETFE), ethylene-propylene copolymer (EPC), poly(4-methyl-1-pentene) (TPX® available from Mitsui Chemicals, Inc.), other polyolefins, other fluoropolymers, polyaryletherether ketone polymer (PEEK), polyphenylene sulfide polymer (PPS), polyetherketoneketone polymer (PEKK), modified polyphenylene sulfide polymer, polyether ketone polymer (PEK), maleic anhydride modified polymers, PrimoSpire® SRP polymers (self-reinforcing polyphenylene manufactured by Solvay Advanced Polymers, based on a substituted poly (1,4-phenylene) structure where each phenylene ring has a substituent R group derived from a wide variety of organic groups), or the like, and any mixtures thereof, or even thermosetting materials such as epoxy. Once the optical fiber core is made, an insulating layer may be placed over the optical fiber assembly and an outer metallic tube may be drawn over the resin jacket or the insulating layer to complete the slickline cable (step 28).

In accordance with embodiments of the invention, a slickline cable incorporates at least one optical fiber, which may be any commonly available optical fiber. Such optical fibers may be made of glass or plastic, for example. The optical fiber may be single or multi-mode fibers; bend-insensitive optical fibers may also be used. In accordance with some embodiments of the invention, the optical fibers may be coated with a resin, such as acrylic, silicone, perfluoroalkoxy (PFA), polyimide resins, and the like. In some embodiments of the invention, the optical fibers may be bundled where the fibers may be orientated at a zero lay angle or any suitable lay angle with respect to the center axis of the bundle. In some cases where the optical fibers are at a lay angle, other than zero, the angle is preferably 1 degree to 21 degrees relative to the center axis of the bundle, more preferably 1 degree to 15 degrees relative to the center axis of the bundle.

As noted above, the composite resin jacket enclosing the fiber optic is preferably made of a fiber-reinforced polymer composite. The polymer used in a fiber-reinforced polymer composite of the invention may be a thermoplastic or thermoset resin. The thermosets may include epoxy, esters, imides, etc. Thermoplastic resins may include, for example, polyether ketone ketone (PEKK), polyether ether ketone (PEEK), polyether ketone (PEK), polyphenylene sulfide (PPS) and fluoropolymers, such as Tefzel® (DuPont, Wilmington, Del.), PFA, TFE-Perfluoromethylvinylether copolymer (MFA), fluorinated ethylene propylene copolymer (FEP), and ethylene-chlorotrifluoroethylene copolymer (ECTFE).

In accordance with embodiments of the invention, the fibers used in the fiber-reinforced polymer composites may be carbon, glass, Aramid (e.g. Kevlar®, Twaron® etc.), quartz, ceramic, or other metal, such as aluminum, steel, or other suitable alloys. These fibers are preferably long continuous fibers for strengthening the polymer that forms the resin jacket enclosing the optical fiber. In accordance with some embodiments of the invention, long cut fibers may also be used.

One skilled in the art will recognize that other components of the slickline cable may be included such as an insulation layer and an outer tube. Materials used as insulation may include polymers such as ethylene-propylene copolymer (EPC), (4-methyl-1-pentene) (TPX® available from Mitsui Chemicals, Inc.) and polyethylene (PE), or fluoropolymers such as fluorinated ethylene propylene (FEP) polymers, ethylene-tetrafluoroethylene polymers (Tefzel®), perfluoroalkoxyalkane polymer (PFA), polytetrafluoroethylene polymer (PTFE), polytetrafluoroethylene-perfluoromethylvinylether polymer (MFA), and polymers of ethylene-tetrafluoroethylene (ETFE). The outer tube around the slickline cable may be, for example, steel, Inconel® (Special Metals Corporation, New Hartford, N.Y.), MP35 (H.C. Starck, Inc., Newton, Mass.), or any other suitable alloy.

In accordance with embodiments of the invention, a composite resin jacket for enclosing an optical fiber may comprise a single piece (a rod) or several sections of a rod. Various methods may be used to prepare such a rod or sections of a rod, and various methods may be used to assemble the optical fibers into such a rod (composite resin jacket) and then into a slickline cable. These methods will be illustrates in the examples that follow.

Figure 3:
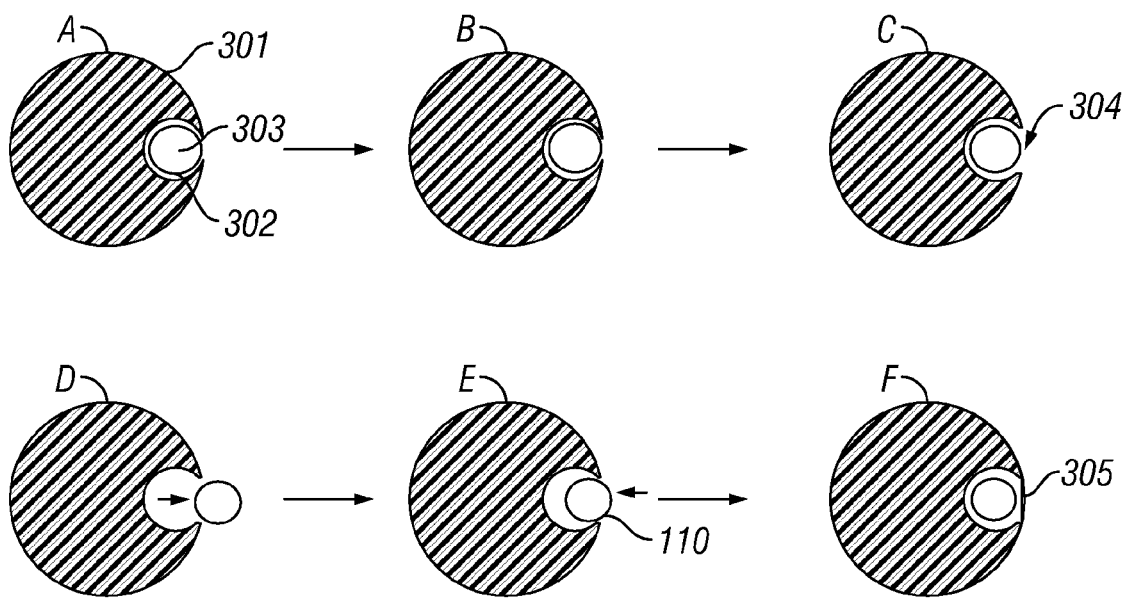
FIG. 3 illustrates a process for making an optical fiber core in accordance with one embodiment of the invention.

In accordance with some embodiments of the invention, the composite resin jacket (fiber-reinforced polymer composite) for use in a slickline cable may comprise a single polymer rod. As shown in FIG. 3, a polymer composite rod 301 having a channel 302 for placement of an optical fiber may be fabricated by extrusion, pultrusion, or rolltrusion. The channel 302 may be formed with an Aramid (e.g. Kevlar® available from DuPont, Wilmington, Del.) yarn 303, which servers as a placeholder for the optical fiber, to create the channel 302 in the polymer composite rod 301.

As shown in FIG. 3, the method is illustrated in six steps. In step a, the polymer composite rod 301 is formed with an Aramid yarn 303 enclosed therein to create a channel 302. After the polymer composite rod 301 cools, and the Aramid yarn 303 cools and contracts, the polymer composite rod 301 may then be scored (step b) to make an opening 304 in the polymer composite rod 301 (step c). Then, the Aramid yarn 303 is removed (step d) leaving behind a channel 302 in the polymer rod 301. In step e, an optical fiber 110 may then be placed in the channel 302. Finally, a thermoplastic or thermosetting material 305 (in the form of a tape for example) may then be applied over the polymer composite rod 301 to hold the optical fiber 110 in place (step f). If a tape is used, the tape can be made of any suitable thermoplastic or thermoset composite material that will bond to the polymer composite rod 301 as well as a polymer layer extruded over it. Alternatively, a polymer material, such as PEEK, PEK, PEKK, or PPS, may be tube extruded over the polymer composite rod to hold the optical fiber in place. In some embodiments, a combination of a tape and a polymer layer may be used.

Figure 4:
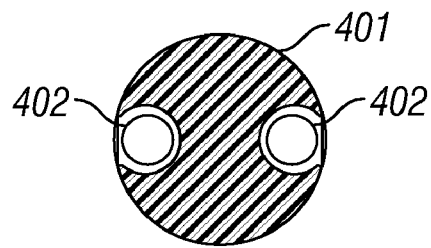
FIG. 4 shows an optical fiber core having two optical fibers in accordance with one embodiment of the invention.

While the method shown in FIG. 3 illustrates the formation of a single channel 302 in a polymer composite rod 301, the method may also be used to form a rod having more than one channel, as shown in FIG. 4, which shows a polymer composite rod 401 having two channels 402.

The two channels 402 may be used to hold two optical fibers, a combination of an optical fiber and a conductor wire, or other combinations. One skilled in the art will appreciate that any number of channels may be made in a polymer composite rod.

While the above example uses an Aramid yarn as a placeholder to create a channel in the resin jacket, other materials that do not stick to the fiber-reinforced polymer composite may also be used. For example, in accordance with some embodiments of the invention, some polymers (without fiber reinforcement or with short fiber-reinforcement) may be used to create the channel for the optical fibers. These polymers may include thermoplastics such as PEEK, PEK, PECK, PPS, polypropylene (PP), TPX®, or EPC. Yet, other polymers include polyamides, polyesters, and fluoropolymers. Such materials may include Nylon-6, Nylon-11, Nylon-12, Nylon-66, polybutylene terphthalate (PBT), perfluoroethylene polymers (FEP), Halar® (Solvay Solexis, Hillsborough, N.J.), MFP, PFA, and Tefzel®.

Figure 5:
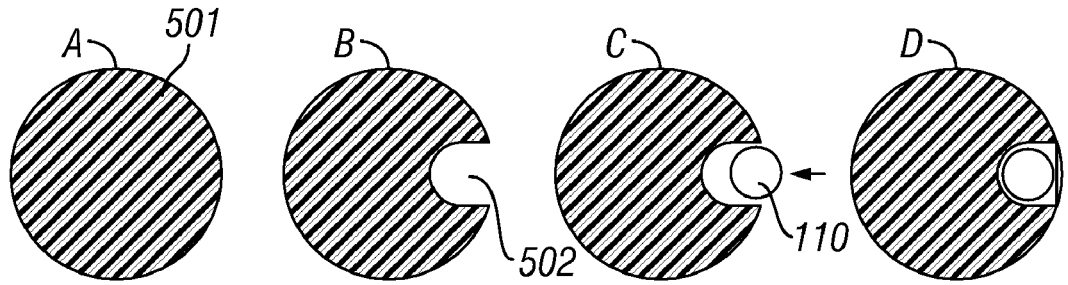
FIG. 5 shows another process for making an optical fiber core in accordance with another embodiment of the invention.

In the above examples, the channels for accommodating optical fibers are formed during the process of forming the composite resin rod. One skilled in the art will recognize that a channel for an optical fiber may also be formed by machining after the fiber-reinforced polymer composite rod has been pultruded, extruded, or rolltruded. FIG. 5 shows a schematic illustrating one of such processes. As shown, a polymer composite rod 501 is first formed (state a), e.g., by pultrusion, extrusion, or rolltrusion. Then, a channel 502 is machined in the rod 501 to accommodate a fiber optic (state b). Next, an optical fiber 110 is placed in the channel (state c). Finally, the channel is sealed with a tape, a polymer layer, or a combination of a tape and a polymer layer, as note above (state d).

Figure 6:
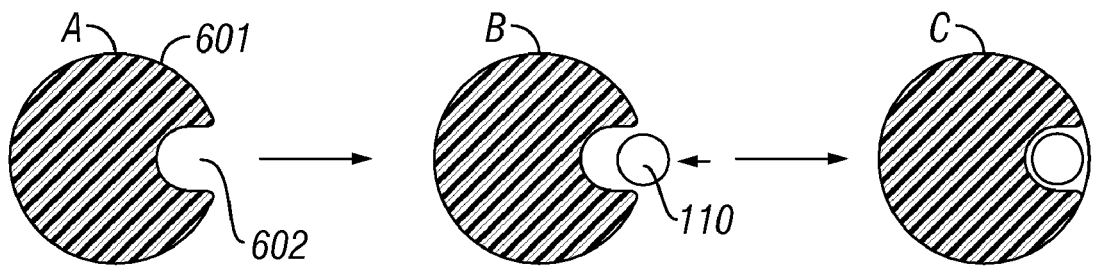
FIG. 6 shows a process for making an optical fiber core in accordance with another embodiment of the invention.

Alternatively, the fiber-reinforced polymer composite rod may be pultruded, extruded, or rolltruded to include a channel, without the aid of a placeholder, during the formation of the composite rod. For example, FIG. 6 shows that a fiber-reinforced polymer composite rod 601 is made with a channel 602 (state a). An optical fiber 110 is then placed into the channel 602 (state b). Afterwards, a tape, a polymer layer, of a combination of a tape and a polymer layer is used to secure the optical fiber in place (state c). Note that irrespective of how the channel is formed, the channel may be configured to accommodate the optical fiber snugly or loosely.

Figure 7:
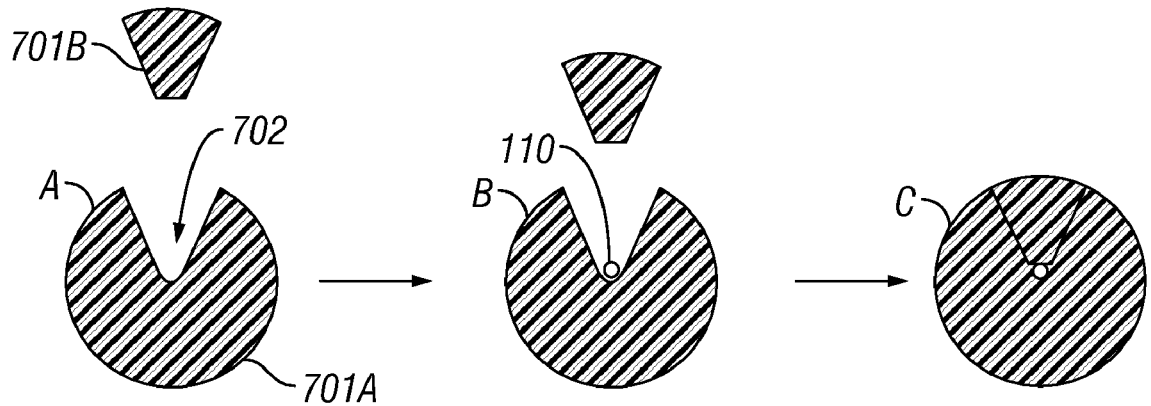
FIG. 7 shows a process for making an optical fiber core in accordance with another embodiment of the invention.
Figure 8:
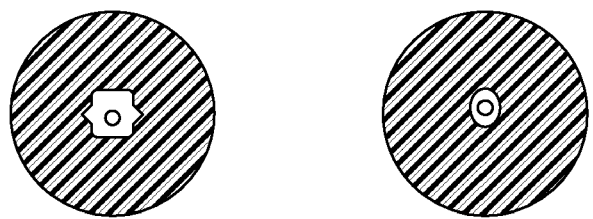
FIG. 8 shows two optical fiber core having different shapes of channels that accommodate the optical fibers in accordance with embodiments of the invention.

The examples describe so far have the resin jacket constructed as a unitary piece. Some embodiments of the invention may have such composite resin rods constructed in more than one piece that are then assembled to form the composite resin rods (or jackets). For example, FIG. 7 shows that two fiber-reinforced polymer composite pieces (701A, 701B) may be manufactured with complementary profiles that will form a channel 702 when assembled. Two fiber-reinforced polymer pieces 701A, 701B of complementary shapes may be pultruded, extruded or rolltruded (state a). While the two pieces 701A and 701B are shown having different sizes, one of ordinary skill in the art would appreciate that they may also be of the same sizes and/or shapes. One or more optical fibers 110 are placed at where the channel will form upon assembly (state b). Finally, the two pieces 701A and 701B are assembled and secured together by thermoplastic or thermosetting tape, a polymer layer, or a combination of a tape and a polymer layer as previously described. Note that the channel formed from the assembly of the pieces need not fit the optical fibers snugly and such channels may have various shapes. FIG. 8 shows some examples of channels that have different shapes after the assembly of the pieces.

Figure 9:
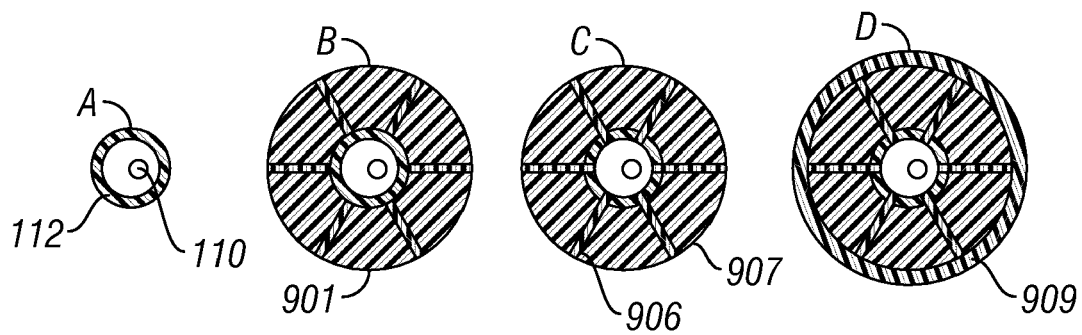
FIG. 9 shows a process for making an optical fiber core, using multiple pieces of arc-shaped wedges to form a resin jacket, in accordance with another embodiment of the invention.

While the example in FIG. 7 uses two pieces to form the composite resin jacket, FIG. 9 shows another example comprising a composite resin rod/jacket formed of six arc-profiled pieces. As shown in FIG. 9, an optical fiber 110 may be first enclosed in an inner polymer tube 112, which may be made of a polymer, with or without short cut fibers (state a). Arc-profiled wedges 901 may be assembled about the circumference of the inner polymer tube 112 to form the composite resin jacket (state b). Arc-profiled wedges 901 may be formed by pultrusion, extrusion, or rolltrusion of fiber-reinforced polymer composite. The spaces between the arc-profiled wedges 901 may be filled with virgin polymer 906, which may be the same as that used for the inner polymer tube and the same polymer composite 112 (state c). In addition, a virgin polymer layer 907 may be coated over the assembled rod to help secure the assembly. The virgin polymer that is filled in the gaps and over the rod may be applied with any suitable method, such as extrusion.

Finally, another layer 909, which may be an insulating layer, of a short-fiber reinforced polymer may be placed over outer layer 907 to complete the fiber optic assembly. Note that the polymer used for the inner polymer tube 112, the polymer 906 filling between continuous or long-fiber reinforced polymer wedges, the coat layer 907, the polymer used in the composite, and the final layer 909 may include the same base polymer. The whole assembly can then be disposed in an outer metallic tube, as in a conventional slickline cable.

In the example shown in FIG. 9, the inner polymer tube 112 is constructed of a unitary piece. One of ordinary skill in the art would appreciate that this inner polymer tube, or resin composite jacket, may also be constructed of multiple pieces, in a fashion similar to those shown in FIGS. 7-9. In addition, the interfaces of such multiple pieces may be so configured that they can interlock when assembled.

Figure 10:
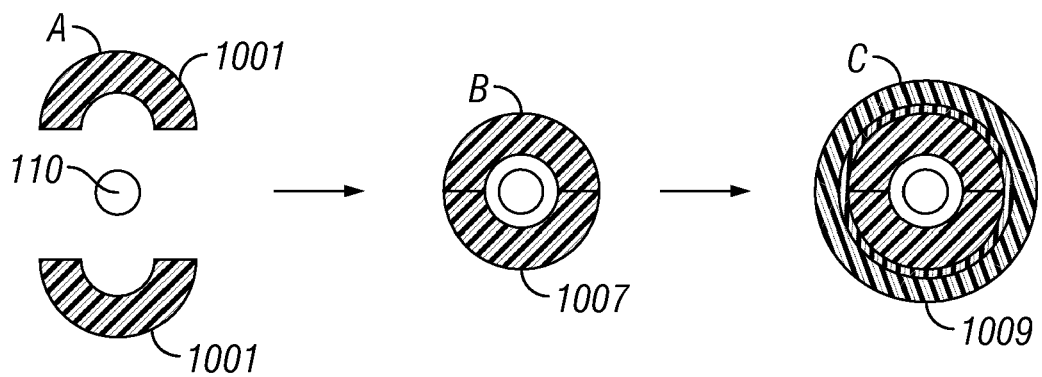
FIG. 10 shows a process for making an optical fiber core, using two semicircular pieces to form the inner tube, in accordance with another embodiment of the invention.

FIG. 10 shows one example of the inner composite resin jacket tube formed of two semi-circular sections 1001. The two semi-circular pieces 1001 are assembled around an optical fiber 110, and then a polymer layer 1007 may be extruded over the assembly (and between the two pieces 1001) to secure the "composite resin jacket" over the optical fiber 110 (state b) and to create a more circular profile. Finally, an outer metallic tube 1009 may be drawn over the assembly to complete the fiber optic element (state c).

Figure 11:
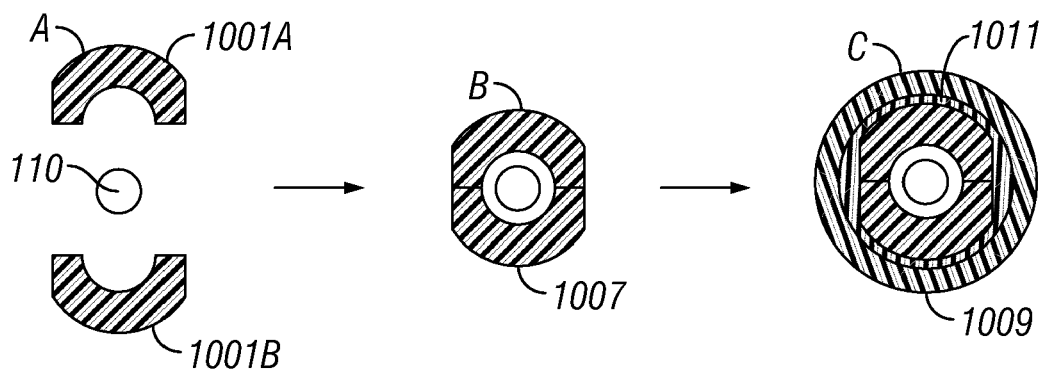
FIG. 11 shows a process for making an optical fiber core, using two pieces of polymer rods to form an inner tube that accommodates the optical fiber, in accordance with one embodiment of the invention.

The two semi-circular pieces shown in FIG. 10 do not need to have a circular outer profile when assembled. In fact, incorporation of flat surfaces, as shown in FIG. 11, may facilitate the control of the pieces' positions during manufacturing and allows for better dimension control during pultrusion that is used to create these profiles. As described with reference to FIG. 10, the two pieces shown in FIG. 11 may be assembled in a similar manner and a polymer layer 1011 is extruded over the two pieces 1007 after assembly. The polymer layer 1011 helps secure the two piece assembly and to create a circular outer profile. Finally, an outer metallic tube 1009 may be drawn over the polymer layer 1011 to complete the optical fiber component. The interfaces between the two pieces shown in FIG. 11 may also be configured to interlock with each other when assembled.

Figure 12:
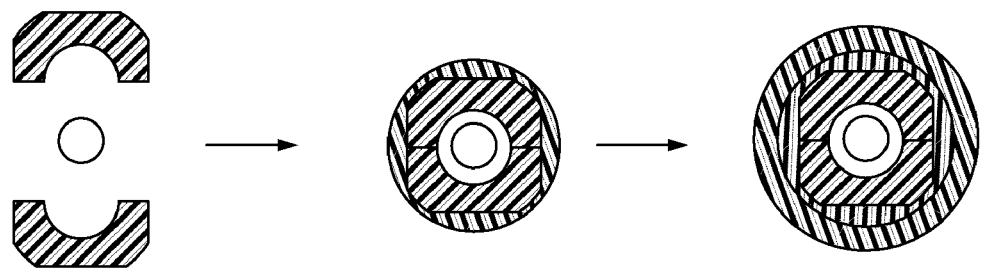
FIG. 12 shows a process for making an optical fiber core, using two pieces of polymer rods to form an inner tube that accommodates the optical fiber, in accordance with another embodiment of the invention.

FIG. 12 shows yet another example, in which the outer profiles of the two pieces that are to be assembled to form the inner tube have mostly flat surfaces. One of ordinary skill in the art would appreciate that other modifications and variations are possible without departing from the scope of the invention. Furthermore, while the above example shows one optical fiber in the assembly, any number of optical fibers may be incorporated in the central tube, and the central tube may be made of virgin polymer, short-fiber reinforced fiber polymer, long-fiber reinforced polymer, or continuous-fiber reinforced polymer. Also, a plurality of optical fibers may be helically bundled together and used in place of one or more optical fibers orientated at a zero lay angle relative the axis.

Figure 13:
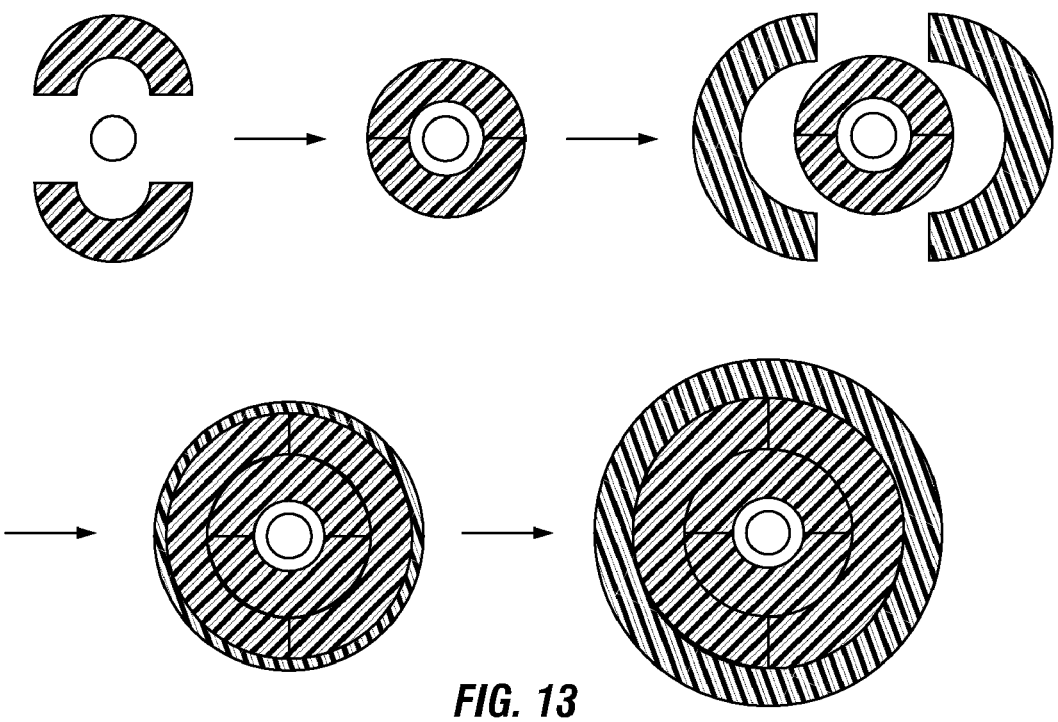
FIG. 13 shows a process for making an optical fiber core, having an inner tube that comprises multiple layers, in accordance with another embodiment of the invention.

The above FIGS. 1A and 9 show an inner tube that encloses an optical fiber is made of a single layer tube. However, embodiments of the invention may include an inner tube that is made of multiple layers. FIG. 13 shows one example which includes two layers in the inner tube. As shown, the two layers each comprise two semicircular halves, which may be assembled as described above. Again, the interfaces between the pieces may be configured to be interlocking.

Figure 14:
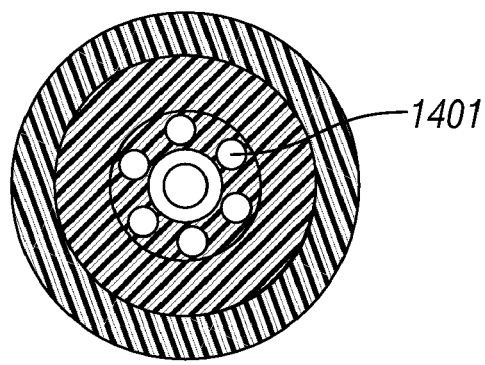
FIG. 14 shows an optical fiber core, having several electrical conductors in addition to the optical fiber, in accordance with another embodiment of the invention.

Some embodiments of the invention relate to slickline cables that also include one or more electrical conductors. The electrical conductors may be standard insulated conductors or stacked dielectric conductors, such as those stacked dielectric conductors described in U.S. Pat. No. 6,600,108, incorporated herein by reference thereto. The electrical conductors may or may not be included in the same channel that accommodates the optical fiber. Alternatively, such electrical conductors may be embedded in one or more of the polymer layers in the slickline cable. Such polymer layers include the layer that forms the inner tube enclosing the optical fiber or the continuous long-fiber-reinforced polymer composite rods (resin jackets) described above. One example of these is shown in FIG. 14. As shown in FIG. 14, several copper wires 1401 are embedded in the polymer layer that forms the inner tube. These conductor wires may be placed at a zero lay angle (or any suitable lay angle) in the polymer layer.

If radiofrequency (rf) or electromagnetic interference (EMI) is a concern, the conductors may be shielded with a proper material. For example, to reduce rf interference, copper, aluminum, galvanized steel, or conductive rubber, plastic or paint may be used. In accordance with some embodiments of the invention, a shield (e.g., a copper shield) may be placed over the insulated conductors to minimize possible rf interference. The shield may be prepared using a material (e.g., copper) in a form of served copper flat, round wires, or copper tape.

Figure 15:
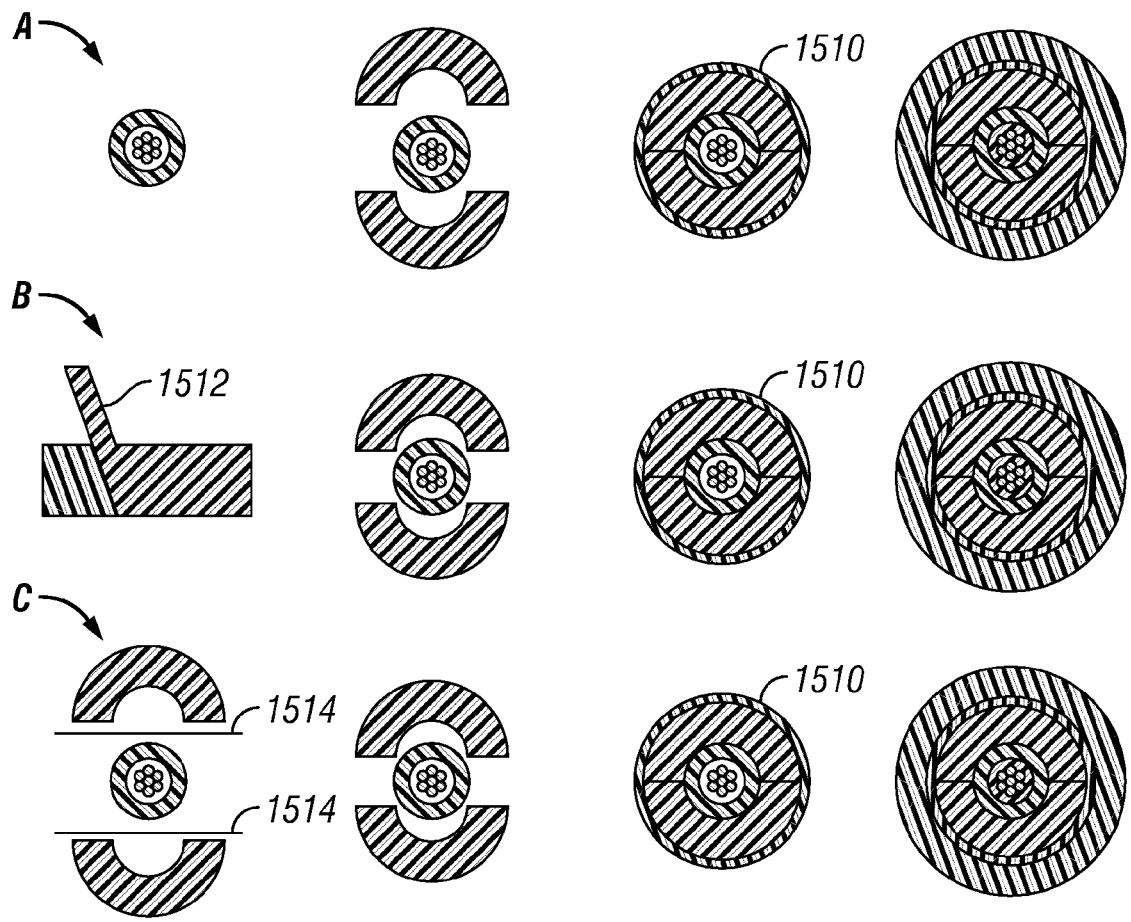
FIGS. 15A-15C show three processes for including a copper shield around electrical conductors in a hybrid optical fiber-electric conductor core in accordance with one embodiment of the invention.

FIGS. 15A-15C illustrate three different methods for placing a shield (e.g., a copper shield). FIG. 15A illustrates a method of "cigarette wrapping" using a material in a form of a tape 1510. In this method, the tape is foil, acetate wrapped longitudinally over the conductor. FIG. 15B shows a method of wrapping a tape 1512 or a wire around the conductor in a spiral path. FIG. 15C shows a method using two tapes 1514 (or flat pieces) placed along the longitudinal direction that sandwich the conductor and wrap around the conductor when the two semicircular pieces are assembled to form a tube around the conductor. Note that these methods are for illustration only. One of ordinary skill in the art would appreciate that other variations are possible without departing from the scope of the invention.

Figure 16:
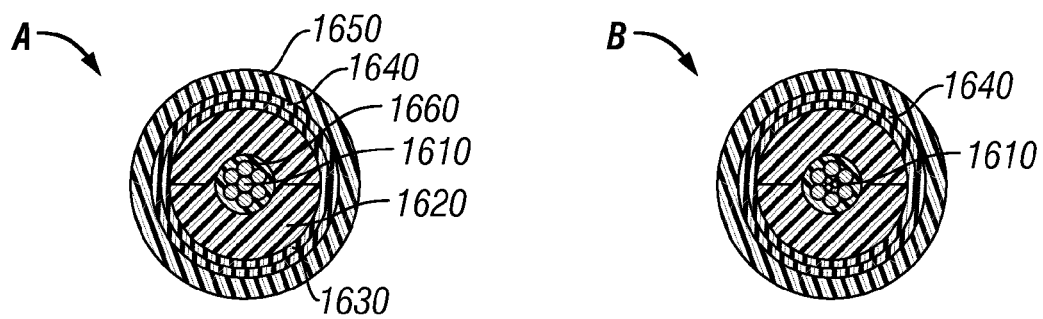
FIGS. 16A and 16B show optical fiber cores having electrical conductors included in the same channel as the optical fiber in accordance with one embodiment of the invention.

In accordance with some embodiments of the invention, a slickline cable may include one or more optical fibers and one or more conductors, i.e., a hybrid electrical-fiber optic slickline. As shown in FIG. 16A, a slickline in accordance with one embodiment of the invention may include an optical fibers 1610 and several conductors 1660 cabled around the optical fiber 1610. The hybrid electrical-optical fiber core is held in an inner tube 1620 made of a polymer, such as UV curable epoxy, thermoplastic resin, or the like. The inner tube 1620 is surrounded by a composite resin jacket 1630 that may be made of a continuous or long-fiber-reinforced polymer composite, as described above. An additional layer (e.g., insulating layer) of polymer 1640 may be disposed outside the resin jacket 1630. The polymer layer 1640 may be made of UV curable epoxy, thermoplastic, or other suitable materials. Finally, an outer metallic tube 1650 is drawn over the polymer layer 1640 to complete the slickline cable. Note that the polymer layers in this embodiment may be made of UV curable epoxy. By using UV curable epoxy, there is no need to subject the optical fiber to heat that is typically encountered when extruding or pultruding melted polymers over an optical fiber. The optical fiber placed on the central axis of the cable may actually be formed of one or more optical fibers, and in some case, may be in the form of a bundle of helically orientated optical fibers, or even a plurality of optical fibers orientated around a central optical fiber.

The embodiment shown in FIG. 16A is presented for illustration only. Other modification and variations are possible without departing from the scope of the invention. For example, FIG. 16B illustrate a variation in which more than one optical fiber is included in the slickline cable. Other variations, for example, may include any feature described with reference to FIG. 2-FIG. 15. For example, one or more of the polymer layers in the cable may comprise multiple pieces. The interfaces between different pieces in the assembly may be configures to have complementary profiles or to have interlocking features.

Figure 17:
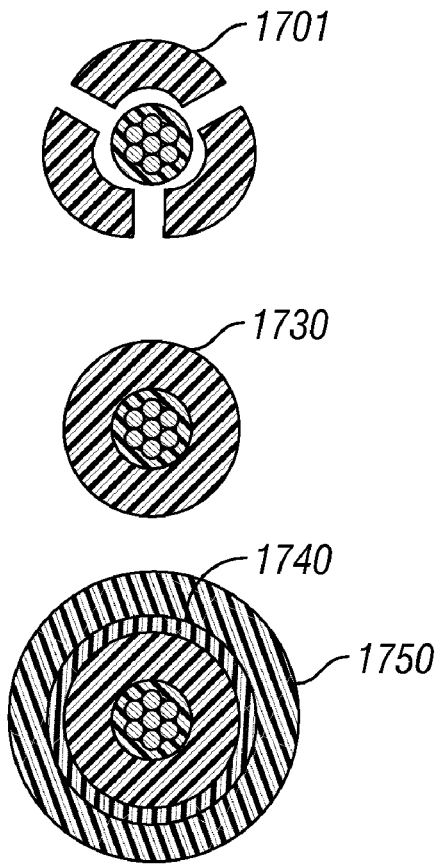
FIG. 17 shows an alternative method for manufacturing an optical fiber core using a plurality of arc-shaped polymer composite tape to form a resin jacket in accordance with one embodiment of the invention.

Other variations may include the use of arc-shaped continuous- or long-fiber-reinforced polymer composite tapes to form the resin jacket that holds the optical fiber core. As shown in FIG. 17, several pieces of arc-shaped continuous- or long-fiber-reinforced polymer composite tape 1701 are assembled around the optical fiber-conductor core to form a composite resin jacket 1730. Note that several layers of the arc-shaped fiber-reinforced polymer composite tapes may be used to create a multiplayer resin jacket. Then, a thermoset or thermoplastic layer 1740, which may be an insulating layer, is applied over the composite resin jacket 1730. The layer 1740 may or may not be bonded to the resin on the composite tape. Finally, an outer metallic tube 1750 is drawn over the thermoset or thermoplastic layer 1740 to complete the slickline cable.

Figure 18:
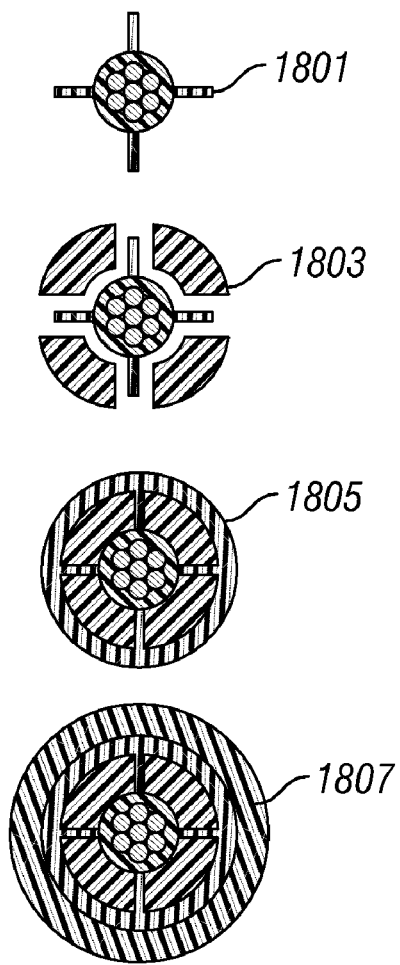
FIG. 18 shows another alternative method for manufacturing an optical fiber core using wings attached to the inner tube and a plurality of pieces of composite tapes to form a resin jacket in accordance with one embodiment of the invention.

FIG. 18 shows yet another variation. As shown in FIG. 18, the optical fiber-conductor core may be wrapped in an inner polymer tube, which may have wings 1801. The wings 1801 are designed to fill the gaps between the arc-shaped polymer composite tapes 1803 that are to be assembled to form the composite resin jacket. Once the resin jacket is formed, an additional polymer layer 1805 maybe extruded over the composite resin jacket. The polymer used for this additional layer 1805 may be the same as the polymer that comprise the wings 1801. Suitable materials may include, for example, PEEK or other thermoplastic resins. Finally, an outer metallic tube may be drawn over the additional layer 1807 to complete the slickline cable.

Figure 19:
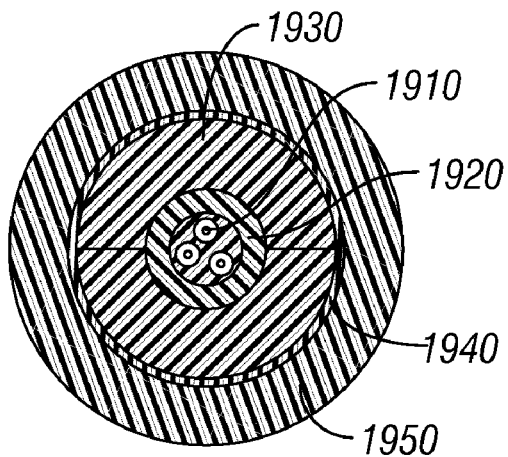
FIG. 19 shows an example of a slickline cable in which optical fibers are disposed inside an inner metallic tube in accordance with one embodiment of the invention.

While most of the above examples are described as having a polymer enclosed optical fiber, embodiments of the invention are not limited to such optical fiber design. FIG. 19 shows one example, in which one or more optical fibers are enclosed in an inner metallic tube; this embodiment is similar to the conventional optical fiber core in the slickline cable shown in FIG. 1A.

As shown in FIG. 19, three optical fibers 1910 are loosely disposed, or even helically bundled, inside the inner tube 1920, which may be metallic or plastic, which is enclosed in a composite resin jacket 1930 made of pre-manufactured components. The composite resin jacket 1930 may be coated with an additional polymer layer 1940 on the outside. Finally, an outer metallic tube 1950 is drawn over the additional polymer layer 1940 to complete the slickline cable.

Advantageously, the present invention provides for one or more of the following advantages. Some embodiments of the invention have optical fiber cores that are formed with pre-formed resin jacket such that the optical fiber is not subjected to high temperature in the manufacturing process. The resin jacket may be formed from one or more pieces, which are assembled to form a channel to accommodate the optical fibers. Some embodiments of the invention include electrical conductors in the slickline cable for conducting electricity or electrical signals.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A cable comprising:
   a pre-manufactured polymer composite rod having a channel therein, wherein the polymer composite rod is made of a continuous or long fiber-reinforced composite;
   an optical fiber disposed in the channel; and,
   a fastener securing the optical fiber within the channel and enclosing the channel, wherein the fastener is formed from a material selected from the group comprising a polymer tape, a polymer layer, and a combination thereof.

2. The cable of claim 1, further comprising an outer tube disposed outside the polymer composite rod having the optical fiber therein.

3. The cable of claim 1, further comprising an inner tube enclosing the optical fiber.

4. The cable of claim 3, wherein the inner tube is a metallic tube.

5. The cable of claim 4, wherein the inner tube is a polymer tube.

6. The cable of claim 5, wherein the polymer tube is assembled from a plurality of pieces.

7. The cable of claim 1, wherein the polymer composite rod comprises a plurality of pieces and the channel therein is formed by assembling the plurality of pieces.

8. The cable of claim 1, further comprising an insulating layer disposed between the outer tube and the polymer composite rod.

9. The cable of claim 2, wherein the outer tube is a metallic tube.

10. The cable of claim 1, further comprising at least one electrical conductor.

11. The cable of claim 10, wherein the at least one electrical conductor is selected from an insulated conductor and a stacked dielectric conductor.

12. The cable of claim 10, wherein the at least one electrical conductor is disposed in the channel together with the optical fiber.

13. The cable of claim 9, wherein the at least one electrical conductor is embedded in the polymer composite rod.

14. The cable of claim 10, further comprising a shield surrounding the at least one electrical conductor.

15. The cable of claim 14, wherein the shield is a copper shield.

16. The cable of claim 1 wherein the cable is a slickline cable.

17. The cable of claim 1 as dispatched into a wellbore.

18. A cable comprising:
a pre-manufactured polymer composite rod having a channel therein, the polymer composite rod made of a continuous or long fiber-reinforced composite;
an optical fiber disposed in the channel; and,
an outer tube disposed outside the polymer composite rod having the optical fiber therein.

19. The cable of claim 18 further comprising a fastener securing the optical fiber within the channel and enclosing the channel.

* * * * *